March 25, 1941.  J. S. DETWILER  2,236,087
PASTEURIZING SYSTEM
Filed April 4, 1940
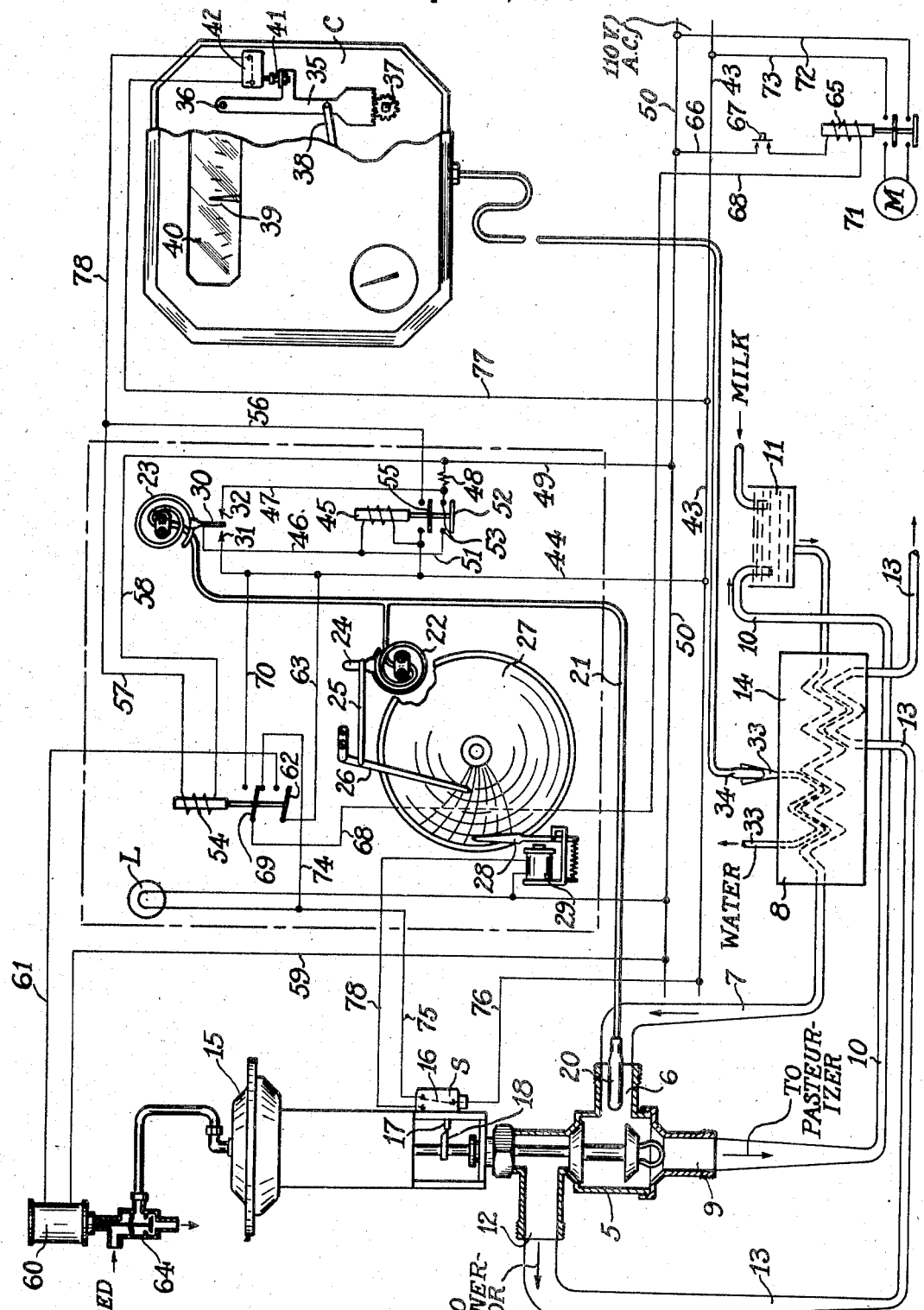
INVENTOR.
JOSEPH S. DETWILER
BY
D. Clyde Jones
ATTORNEY.

Patented Mar. 25, 1941

2,236,087

UNITED STATES PATENT OFFICE 2,236,087

PASTEURIZING SYSTEM

Joseph S. Detwiler, Rochester, N. Y., assignor to Taylor Instrument Companies, Rochester, N. Y., a corporation of New York Application April 4, 1940, Serial No. 327,847

4 Claims. (Cl. 236—18)

This invention relates to pasteurizing systems. In certain types of pasteurizers, notably in flash pasteurizers it is the practice to incorporate in the system a flow diversion valve by which properly pasteurized milk or the like is discharged to the regenerator but improperly pasteurized milk is diverted or returned to the pasteurizer unit for further treatment. In the normal operation of such pasteurizing systems, the milk must be raised to a temperature of 160° F. before it will be discharged by the valve. However, when it becomes necessary to clean such a pasteurizing system and the regenerator included therein, it is desirable to circulate through the entire system, a cleaning liquid at a temperature much lower than the pasteurizing temperature, for example, below 120° F. In the normal operation of this type of pasteurizing system as previously known, the flow diversion valve would move to its flow diverting position when such lower temperature liquid flowed from the pasteurizer whereby the cleaning fluid would be diverted back to the pasteurizer unit and none of this cleaning liquid would flow through the outlet of the flow diversion valve to the remainder of the system including the regenerator.

In accordance with the present invention there is provided a pasteurizing system having a flow diversion valve therein, the system being so arranged that when it is adjusted to a certain low temperature range, the valve will not divert the cleaning fluid back to the pasteurizer. However, when the system is adjusted to operate in the pasteurizing range, the valve will divert the milk or other liquid back to the pasteurizer unit whenever the milk temperature drops below the predetermined value.

For a clearer understanding of the invention, reference is made to the description and claims when taken with the drawing in which the single view illustrates a pasteurizing system having incorporated therein a flow diversion valve, a safety thermal limit controller and a controller for maintaining the heating water at a given temperature, the flow diversion valve and the controller being shown in front elevation partially in section.

The pasteurizing system generally may be similar to that disclosed in Fielder Patent No. 1,859,504, granted May 24, 1932, while the flow diversion valve herein illustrated may be similar to that disclosed in the copending application of George Karst, Serial No. 269,437, filed April 22, 1939.

It is unnecessary to describe the specific construction of the flow diversion valve 5, except to state that its inlet 6 is connected by pipe 7 to the discharge end of a pasteurizer unit 8, while the port 9 of this valve is connected by the pipe 10 to the supply tank 11 of the pasteurizer unit or to the milk passage leading to this unit so that the diverted milk may be returned for further pasteurization. The outlet port 12 of this valve may be connected by the pipe 13 to the regenerator unit 14. This valve 5 is of the pneumatically operated type including a motor top 15 to which compressed air is supplied under the control of suitable control mechanism to open against the action of a spring (not shown) which normally tends to close the valve. The frame of the valve 5 has mounted thereon a switch 5 which maintains its movable blade 16 in engagement with its left hand contact except when the switch button 17 engages the coupling clip 18 (the condition illustrated).

The control mechanism for selectively positioning the flow diversion valve includes a bulb 20 of a thermosensitive tube system which bulb is exposed to the milk flowing from the pasteurizer unit 8 into the inlet port 6 of the flow diversion valve. This tube system in addition to the bulb 20 includes a capillary tube 21 connecting the bulb with two Bourdon springs 22 and 23. The tube system is filled with any suitable thermosensitive medium such as mercury or a vaporizable liquid and its vapor. The free end of the Bourdon spring 22 is provided with a suitable take-off bracket 24 which bracket is pivotally connected by a link 25 to the pivotally mounted pen arm 26. This pen arm at its free end is provided with a stylus (not illustrated), which stylus cooperates with a clock driven chart 27 to draw on the chart, a graph corresponding to the temperature prevailing at the bulb 20. A second pen arm 28 has its upper or free end provided with a stylus (not shown) adapted to mark on the margin of the chart 27 to indicate a certain condition of the flow diversion valve. This second pen arm is mounted on the armature of a magnet 29, the operation of which will be further described hereinafter.

The free end of the Bourdon spring 23 is provided with a movable contact 30 which is mounted between two spaced, fixed contacts 31 and 32, as will be hereinafter set forth.

The system also comprises a temperature controlling device generally designated C for controlling the temperature of the heating water while circulating in the pipe 33 through the pasteurizing unit 8. The controller further includes temperature set-point adjusting mechanism in the form of an arm 35 which is pivoted at its upper end at 36. The lower end of this arm is provided with segment teeth adapted to mesh with teeth of an adjusting gear 37. Any suitable means such as a key, may be provided to rotate this gear either clockwise or counterclockwise to a position of adjustment. The arm 35 is connected by a link 38 to an index 39 which is movable over a suitable temperature scale generally indicated at 40. Thus by rotating the gear 37, the index 39 is moved over the scale to indicate the desired set point or controlling temperature. It will be understood that the controller mechanism operates by means (not shown) to maintain the heating water in the pasteurizer unit 8 at the desired or set-point temperature. It will be noted that the arm 35 is provided with a bracket 41. This bracket when moved into the position shown, closes a single pole switch generally designated 42.

It is believed that the invention will best be understood by describing the operation of the system when it is functioning to control the pasteurization of milk. During pasteurization the index of the controller C is set at 160° F. so that the bracket 41 on the set point adjustment opens the contacts of switch 42. As long as the milk is being discharged from the pasteurizer into the inlet of the flow diversion valve, at the prescribed temperature, namely, at 160° F., the thermosensitive fluid in the bulb 20 of the tube system will expand, causing both of the Bourdon springs 22 and 23 to unwind. The unwinding of the Bourdon spring 22 moves the pen arm 26 to a position in which it records on the chart 27 the temperature prevailing at the bulb 20. When the Bourdon spring 23 unwinds, it brings the movable contact 30 carried thereby into engagement with the fixed contact 32. As a result of the closure of these contacts a circuit is completed from the power conductor 43, conductor 44, winding of the relay 45, conductor 46, movable contact 30, fixed contact 32, conductor 47, resistor 48, conductor 49 to the power conductor 50. Under the control of this circuit, the relay 45 is energized and thereby closes a locking circuit for itself from the power conductor 43, conductor 44, winding of the relay 45, conductor 51, armature 52, and its related normally open contacts 53, resistor 48, conductor 49 and power conductor 50. Thus the relay 45 has a locking circuit completed for itself which circuit is independent of its original energizing circuit.

With the relay 45 operated, an energizing circuit is completed for the relay 54. This circuit extends from the power lead 43, conductor 44, armature 55 and its normally open contact, conductors 56 and 57, winding of the relay 54, conductors 58 and 49, the power conductor 50. With the relay 54 operated, a circuit is completed from the power lead 50, conductor 59, through magnet of the electrically-operated valve 60, conductor 61, front contact and armature 62 of the relay 54, conductors 63 and 44, to the power conductor 43. The winding of the electrically operated valve 60 is energized to open the valve 64 so that compressed air is supplied to the motor top 15 of the flow diversion valve. This motor opens the valve 5 so that milk can flow therethrough from the inlet port 6 to the outlet port 12 thereof.

Also with the relay 54 operated, a circuit is also completed for operating the motor control relay 65. This circuit is traceable from the power lead 50, conductor 66, contacts of the manually operated switch 67, winding of the relay 65, conductor 68, armature 69 and front contact of relay 54, conductors 70 and 44, to the power conductor 43. The relay 65 when energized in this manner attracts its armature to close an energizing circuit for the motor 71 which circuit includes the conductors 72 and 73 and the power leads 43 and 50. The motor 71 operates to drive a pump (not shown) which, in turn, forces the milk through the pasteurizer and through the flow diversion valve which, under the condition assumed, is in its open position permitting the milk to flow through its outlet port 12.

If the milk discharged from the pasteurizer is below the prescribed temperature, the thermosensitive medium in the bulb 20 will contract. This permits the Bourdon springs 22 and 23 to wind up. As the Bourdon spring 22 winds up, the pen arm 26 records the lower temperature, on the chart 27. When the second Bourdon spring 23 winds up, the movable contact 30 carried thereby, engages the fixed contact 31. When this takes place, a circuit is completed from the power lead 43, conductor 44, fixed contact 31, movable contact 30, conductors 46 and 51, armature 52 and its normally open contacts 53, resistor 48, conductor 49, to the power conductor 50. This circuit shunts the winding of the relay 45 so that this relay deenergizes to retract its armatures and thereby open the previously described locking circuit for itself. As soon as the relay 45 releases its armatures, the energizing circuit of relay 54 is opened and this relay also retracts its armatures. When the relay 54 deenergizes, the winding 60 of the electrically operated valve 64 deenergizes causing this valve to cut off the flow of compressed air to the motor 15 of the flow diversion valve 5. The spring (not shown) of the flow diversion valve moves the disks of this valve to a position for cutting off the outlet port 12 of the valve and for connecting the inlet port 6 thereof to the flow diverting port 9 so that the improperly pasteurized milk is returned to the pasteurizer for further treatment. With the valve in its diverting position, the clip 18 which couples the valve stem with the valve stem extension, depresses the button 17 of the switches to move the switch blade 16 to the position illustrated in dotted lines. Also when the relay 54 deenergizes it opens the original energizing circuit for the motor controlling relay 65. However, this relay is energized at this time in a circuit traceable from the power conductor 50, conductor 66, push button switch 67, winding of relay 65, conductor 68, armature 69 and back contact of relay 54, conductors 74 and 75 through the switch S, conductor 76 to the power conductor 43. With the circuit for the motor 71 still completed, the motor drives the pump (not shown) which advances the milk through the diversion port 9.

However, at the close of the pasteurizing operation when it is desired to force cleaning liquid through the system, the set pointer or index 39 of the controller C is adjusted to a set-point or temperature well below the pasteurizing range, for example, at a temperature below 120° F. In the absence of the present invention, the flow diversion valve would move to the position herein disclosed, that is, to the position where it diverts the liquid through port 9. Thus it would not be possible for the cleaning liquid to flow through the outlet port 12 of this valve and to the regenerator 14 or other apparatus connected thereto. However, in the present arrangement when the controller is adjusted to a set point temperature below 120° F., the bracket 41 closes the contacts of the switch 42. With this switch closed the relay 54 will be operated independently of the operation of the relay 45, as well as independently of the position of the movable contact 30. Thus when the switch 42 is closed in the manner just described, a circuit is completed from the power conductor 43, conductor 77, the closed contacts of switch 42, conductors 78 and 57, winding of the relay 54, conductors 58 and 49, to the power conductor 50. The relay 54 is energized in this circuit and closes a circuit which operates the electrically-operated valve 64. This valve then opens to supply compressed air to the motor top 15 of the flow diversion valve which is thus maintained open. Also when the relay 54 is energized, the motor control relay 65 operates to close a circuit for the motor 71 as already described. This motor will thus operate the pump and force the cleaning liquid through the system.

It has been mentioned that a second pen arm 28 cooperates with chart 27 to indicate the adjustment of the flow diversion valve. When this valve is positioned to permit milk to flow through its discharge port 12, the clip 18 will be out of contact with the switch button 12. Switch S will move its blade 16 to the left hand contact. This completes a circuit from power lead 43, conductor 76, switch S, conductor 78, winding of magnet 29, to the power lead 50. Magnet 28 is energized and moves the pen arm toward the margin of the chart, thereby changing the direction of the graph being drawn thereon. On the other hand, when the flow diversion valve is adjusted to its diverting position, the clip 18 contacts the switch button 17 to move the switch blade 16 to the position illustrated. With the switch in this position, the magnet 29 has its energizing circuit interrupted. The magnet 29 retracts its armature thereby moving the pen arm away from the margin of the chart with the result that the course of the graph is changed. The path of this graph affords an accurate record of the periods during which the milk is being discharged or reverted. Also with the switch S in the position shown, that is, in the flow diverting position an obvious circuit is closed for the signal lamp which is lighted while the milk is being diverted.

I claim:

1. In a pasteurizing system provided with a flow diversion valve, said valve having an inlet port, an outlet port and a diversion port, means normally responsive to the temperature of a liquid introduced into said inlet port for opening said outlet port and closing said diversion port when said liquid is at a given temperature and for reversing the condition of said last-mentioned ports when said liquid is below said given temperature, means including an adjustable controller for maintaining said liquid at said given temperature said controller being provided with an index for indicating the temperature to be maintained in said liquid, and means responsive to an adjustment of said controller and its index to a temperature below said given temperature for maintaining said outlet port open and said diversion port closed irrespective of the temperature of the liquid introduced into said inlet port.

2. In a pasteurizing system provided with a flow diversion valve, said valve having an inlet port, an outlet port and a diversion port, means including an electric contact thermometer normally responsive to the temperature of the liquid introduced into said inlet port for opening said outlet port and for closing said diversion port when said liquid is at a given temperature and for reversing the condition of said last-mentioned ports when said liquid is below said given temperature, means including an adjustable controller for maintaining said liquid at said given temperature said controller being provided with an index for indicating the temperature to be maintained in said liquid, and means independent of said electric contact thermometer but responsive to an adjustment of said controller and its index to a temperature below said given temperature for maintaining said outlet port open and said diversion port closed irrespective of the temperature of the liquid introduced into said inlet port.

3. In a pasteurizing system provided with a flow diversion valve, said valve having an inlet port, an outlet port and a diversion port, means including a solenoid for controlling the operation of said flow diversion valve, means including an electric contact thermometer normally responsive to the temperature of a liquid introduced into said inlet port for operating said solenoid to effect an opening of the outlet port and closing of said diversion port when said liquid is at a given temperature and for reversing the condition of said last mentioned ports when said liquid is below said given temperature, means including an adjustable controller for maintaining said liquid at said given temperature, and means independent of said electric contact thermometer but responsive to an adjustment of said controller to a temperature substantially below said given temperature for actuating said solenoid to maintain said outlet port open and said diversion port closed irrespective of the temperature of the liquid introduced into said inlet port.

4. In a pasteurizing system provided with a flow diversion valve, said valve having an inlet port for receiving a liquid, an outlet port and a diversion port, means including a relay for controlling the operation of said flow diversion valve, means including an electric contact thermometer having a pair of spaced fixed contacts as well as a movable contact mounted between said fixed contacts, said movable contact in response to changes in temperature of liquid introduced into said inlet port being movable into engagement with said fixed contacts respectively, an energizing circuit for said relay completed by the engagement of said movable contact and one of said fixed contacts, a locking circuit for said relay independent of said last-mentioned contacts and completed on energization of said relay, said movable contact and said other fixed contact when in engagement serving to shunt said relay, means including an adjustable controller for maintaining said liquid at a given temperature, and means independent of said electric contact thermometer but responsive to an adjustment of said controller to a temperature substantially below said given temperature for operating said valve whereby said outlet port is maintained open and said diversion port is maintained closed irrespective of the temperature of the liquid introduced into said inlet port, said last-mentioned means including at least a part of said first-mentioned means.

JOSEPH S. DETWILER.